(12) United States Patent
Li et al.

(10) Patent No.: US 12,228,807 B2
(45) Date of Patent: Feb. 18, 2025

(54) VARIABLE TINT LIGHT LENSES AND GLASSES

(71) Applicant: Wicue, Inc., Cupertino, CA (US)

(72) Inventors: Fenghua Li, Cupertino, CA (US); Cai Guo, Shenzhen (CN)

(73) Assignee: WICUE USA INC., Santa Clara, CA (US)

( * ) Notice: Subject to any disclaimer, the term of this patent is extended or adjusted under 35 U.S.C. 154(b) by 247 days.

(21) Appl. No.: 17/892,315

(22) Filed: Aug. 22, 2022

(65) Prior Publication Data

US 2023/0066288 A1 Mar. 2, 2023

Related U.S. Application Data

(60) Provisional application No. 63/236,129, filed on Aug. 23, 2021.

(51) Int. Cl.
| | |
|---|---|
| *G02C 7/10* | (2006.01) |
| *G02C 7/12* | (2006.01) |
| *G02F 1/1337* | (2006.01) |

(52) U.S. Cl.
CPC ............ *G02C 7/101* (2013.01); *G02C 7/12* (2013.01); *G02F 1/133757* (2021.01); *G02F 2202/16* (2013.01)

(58) Field of Classification Search
None
See application file for complete search history.

(56) References Cited

FOREIGN PATENT DOCUMENTS

| | | | |
|---|---|---|---|
| CN | 101639578 A | * | 2/2010 |
| CN | 113448119 A | * | 9/2021 |

* cited by examiner

*Primary Examiner* — Phu Vu
(74) *Attorney, Agent, or Firm* — PV IP PC; Wei Te Chung

(57) ABSTRACT

The invention discloses a variable tint lens and glasses. The variable tint lens includes a first polarizer, a second polarizer, and a liquid crystal layer arranged between the first polarizer and the second polarizer, a first conductive film arranged between the first polarizer and the liquid crystal layer, and a second conductive film arranged between the second polarizer and the liquid crystal layer, the first conductive film and the second conductive film are also connected to a power supply device. The arrangement direction of the liquid crystal molecules in the liquid crystal layer changes according to the voltage provided by the power supply device, so that the refractive index of the liquid crystal molecules to the light is changed, and the color of the light passing through the liquid crystal layer is changed. Compared with the prior art, the present invention can continuously change the color of light passing through the variable tint lens and adjust the brightness of the light. It is equipped with automatic adjustment and manual adjustment, which can adjust the color of the light according to actual needs, which improves the user experience.

17 Claims, 1 Drawing Sheet

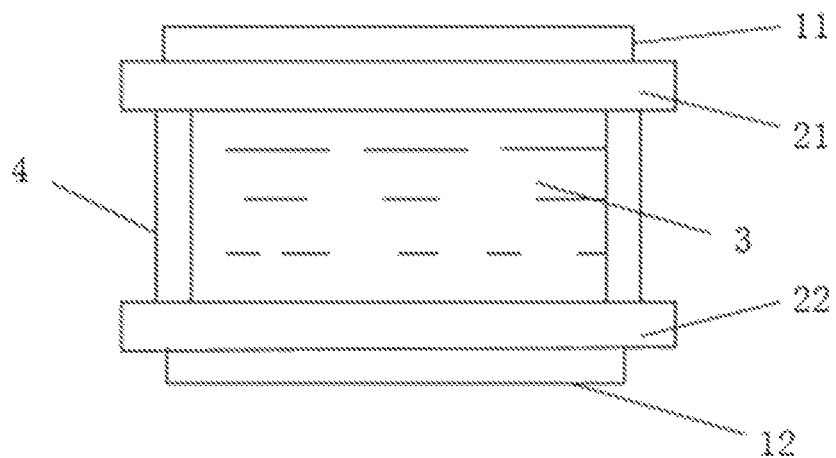

VARIABLE TINT LIGHT LENSES AND GLASSES

CROSS-REFERENCE TO RELATED APPLICATIONS

This application claims the benefit of U.S. Provisional Application No. 63/236,129, filed Aug. 23, 2021, entitled "VARIABLE TINT LIGHT LENSES AND GLASSES" which is incorporated herein by reference.

TECHNICAL BACKGROUND

The invention relates to the technical field of glasses, in particular to a variable tint lens and glasses.

BACKGROUND

Traditional dimming glasses are chemically photochromic by adding silver halide. This kind of dimming glasses will automatically chemically react with ultraviolet rays to darken outdoors, and will automatically return to a transparent state indoors or in places without ultraviolet rays. The response speed is slow, which cannot meet people's needs for fast switching of the light transmittance of the dimming glasses. At the same time, for traditional dimming glasses, there is generally only one color change in light and shade, and the color change is relatively single, which cannot well meet the needs of users.

Therefore, how to design a color-changing lens and glasses with good color-changing effect is a technical problem to be solved urgently in the industry.

SUMMARY OF THE INVENTION

Aiming at the problem of poor dimming effect of dimming glasses in the prior art, the present invention proposes a variable tint lens and glasses.

The technical solution of the present invention is to provide a color-changing dimming lens, including:

A first polarizer and a second polarizer, a liquid crystal layer is arranged between the first polarizer and the second polarizer.

The first conductive film is arranged between the first polarizer and the liquid crystal layer.

The second conductive thin mold is arranged between the second polarizer and the liquid crystal layer.

The power supply device is connected to the first conductive film and the second conductive film, receives control signals, and provides different voltages to the liquid crystal layer through the first conductive film and the second conductive film, so that the arrangement direction of the liquid crystal molecules changes according to the magnitude of the voltage provided by the power supply device, so that the refractive index of the liquid crystal molecules to light is changed to change the color of the light passing through the liquid crystal layer.

Further, the liquid crystal molecules have an elliptical shape with a first refractive index along the long axis direction and a second refractive index along the short axis direction. The refractive index of the liquid crystal molecules is determined according to the first refractive index, the second refractive index, and the arrangement direction.

Further, the phase difference between the light passing through the liquid crystal layer and the incident light satisfies:

$$\delta = \delta_0 \left\{ \frac{1}{4}\left[(n_e/n_o)^2 + n_e/n_o\right]^{-1} \left[V^2 - V_{th}^2\right]\left[\frac{2}{3}V^2 + (K_{33} - K_{11})V_{th}/K_{11}\right]\right\}.$$

Among them, $\delta$ is the phase difference, $\delta_0$ is the phase difference under zero electric field, $n_e$ is the refractive index of liquid crystal molecules, and $n_o$ is the refractive index of light in the air.

Further, when the angle between the first polarizer and the second polarizer is between 60° and 120°, the variable tint lens is in a normally transparent state, and the color of the light passing through the adjustable light lens becomes darker.

Further, when the included angle between the first polarizer and the second polarizer is between −30° and 30°, the variable tint lens is in a normally dark state, and the light through the variable tint lens, the light color becomes lighter.

Further, both the first polarizer and the second polarizer include at least one color area. The color of the light passing through the variable tint lens is determined according to the color combination of the first polarizer and the second polarizer and the refractive index of the liquid crystal molecules.

Further, the angle between the light passing through the variable tint lens and the polarizer and the liquid crystal molecules satisfies:

$$I(\lambda) = A^2 \left\{ \cos^2(\beta - \gamma) - \sin 2\beta \sin 2\gamma \sin^2 \frac{\delta}{2} \right\}.$$

Among them, $I(\lambda)$ is the transmittance of light of different wavelengths, A is the initial incident light intensity, $\beta$ is the angle between the direction of the transmission axis of the first polarizer and the long axis of the liquid crystal molecules, $\gamma$ is the angle between the direction of the light transmission axis of the second polarizer and the long axis of the liquid crystal molecules.

Further, the power supply device is a photovoltaic power supply device, and the control signal is generated according to the light intensity detected by the photovoltaic power supply device.

Further, the photovoltaic power supply device includes a solar cell, a driving module for converting direct current to alternating current, and a light sensor that detects light intensity, and the output of the photovoltaic power supply device changes according to the light intensity detected by the light sensor.

Further, the power supply device is a rechargeable battery, and the control signal is input by the user according to his own needs.

Further, the power supply device further includes a power-off button, a voltage-up button, and a voltage-down button connected to the rechargeable battery.

The color of light passing through the variable tint lens is adjusted according to the power-off button, the voltage-up button and the voltage-down button.

Further, it also includes a rubber disposed between the first conductive film and the second conductive film, and the rubber and the first conductive film and the second conductive film jointly cover the liquid crystal layer.

Further, the liquid crystal layer uses one of TN, STN, ECB, and VA materials.

Further, the materials of the first conductive film and the second conductive film are both ITO.

The present invention also provides a spectacle, which includes a lens and a frame, and the lens adopts the above-mentioned variable tint lens.

Compared with the prior art, the present invention has at least the following beneficial effects:

1. Through the cooperation of the power supply device and the liquid crystal layer, the variable tint lens can change the color of the transmitted light, the light switching speed is fast and can be changed continuously, and the dimming effect is good.

2. By setting the angle between the first polarizer and the second polarizer, the brightness of the light passing through the variable tint lens can be adjusted, which can adapt to different environmental requirements.

3. By setting multiple color areas on the polarizer, the light passing through the variable tint lens can be in multiple colors, which has a better user experience.

4. Through the setting of the charging device, manual adjustment and automatic adjustment of the color of the light can be realized, which is more practical.

BRIEF DESCRIPTION OF THE DRAWINGS

In order to explain the technical solutions in the embodiments of the present invention more clearly, the following will briefly introduce the drawings that need to be used in the description of the embodiments or the prior art. Obviously, the drawings in the following description are only some embodiments of the present invention. For those of ordinary skill in the art, other drawings can be obtained based on these drawings without creative labor.

FIG. 1 is a schematic structural diagram showing a cross-sectional view of an embodiment of the present invention.

Among them, 11 is a first polarizer, 12 is a second polarizer, 21 is a first conductive film, 22 is a second conductive film, 3 is a liquid crystal layer, and 4 is a gasket or sealant to provide enclosure for the liquid crystal mixture of the liquid crystal layer 3.

DETAILED DESCRIPTION OF SPECIFIC EMBODIMENTS

In order to make the technical problems, technical solutions and beneficial effects to be solved by the present invention clearer, the following further describes the present invention in detail with reference to the accompanying drawings and embodiments. It should be understood that the specific embodiments described here are only used to explain the present invention, but not used to limit the present invention.

Therefore, a feature indicated in this specification will be used to describe one of the features of an embodiment of the present invention, instead of implying that each embodiment of the present invention must have the described feature. In addition, it should be noted that this specification describes many features. Although certain features can be combined together to illustrate possible system designs, these features can also be used in other unspecified combinations. Thus, unless otherwise stated, the illustrated combinations are not intended to be limiting.

The principle and structure of the present invention will be described in detail below with reference to the drawings and embodiments.

Traditional dimming glasses are chemically photochromic by adding silver halide. This kind of dimming glasses will automatically undergo a chemical reaction to darken when encountering ultraviolet rays outdoors, and will automatically return to a transparent state indoors or in places without ultraviolet rays. However, its response speed is slow, which cannot meet the user's demand for the light transmittance switching speed of the dimming glasses. The idea of the present invention is to provide a color-changing dimming lens. The power supply device supplies power to the liquid crystal molecules to change the arrangement direction of the liquid crystal molecules, thereby changing the refractive index of the liquid crystal molecules. The phase difference between the light passing through the lens and the incident light is changed, thereby changing the color of the light passing through the lens, and meeting the user's demand for switching speed. A variable tint lens may comprise an optical lens and may be described as being variable in tint or tone.

FIG. 1 is a schematic structural diagram of an embodiment of the present invention. As shown, element 11 is a first polarizer, element 12 is a second polarizer, element 21 is a first conductive film, element 22 is a second conductive film, element 3 is aliquid crystal layer, and element 4 is a gasket or sealant to provide enclosure for the liquid crystal mixture of the liquid crystal layer 3. The gasket or sealant 4 may comprise a material such as rubber.

Specifically, the variable tint lens proposed by the present invention includes:

A first polarizer 11 and a second polarizer 12, and a liquid crystal layer 3 is provided between the first polarizer 11 and the second polarizer 12.

The first conductive film 21 is provided between the first polarizer 11 and the liquid crystal layer 3.

The second conductive thin mold 22 is arranged between the second polarizer 12 and the liquid crystal layer 3.

The power supply device is connected to the first conductive film 21 and the second conductive film 22, and provides voltage to the liquid crystal layer 3 through the first conductive film 21 and the second conductive film 22.

Polarizers can convert natural light into polarized light. With the twisting characteristics of liquid crystal molecules, they can control the passage of light, thereby changing the transmittance of the lens. In the present invention, the liquid crystal layer 3 adopts one of TN, STN, ECB or VA materials, and the arrangement direction of the liquid crystal molecules can be changed according to the magnitude of the external voltage. The refractive index of the liquid crystal molecules is adjusted by the change in the arrangement direction of the liquid crystal molecules, thereby changing the color of the light.

Among them, the shape of the liquid crystal molecules is an ellipse, which includes a first refractive index n1 along the long axis direction and a refractive index n2 along the short axis direction thereof. When the light is incident perpendicular to the direction of its short axis, its refractive index is n1; on the contrary, when the light is incident perpendicular to the direction of its long axis, its refractive index is n2. When the incident angle of the light remains unchanged, by changing the arrangement direction of the liquid crystal molecules, the angle between the incident light and the liquid crystal molecules can be changed, thereby changing the refractive index of the light passing through the liquid crystal molecules, and the refractive index is between n1 and n2.

Specifically, the phase difference between the light passing through the liquid crystal layer 3 and the incident light satisfies:

$$\delta = \delta_0 \left\{ \frac{1}{4} \left[ (n_e/n_o)^2 + n_e/n_o \right]^{-1} \left[ V^2 - V_{th}^2 \right] \left[ \frac{2}{3} V^2 + (K_{33} - K_{11}) V_{th}/K_{11} \right] \right\}.$$

Among them, $\delta$ is the phase difference, $\delta_0$ is the phase difference under zero electric field, $n_e$ is the refractive index of liquid crystal molecules, and $n_o$ is the refractive index of light in the air. V is the voltage applied across the implemented electrodes, such as the first conductive film and the second conductive film. $V_{th}$ is the threshold voltage for inducing a change in the orientation of the liquid crystal molecules of the liquid crystal layer. $K_{33}$ is the bend elastic constant of the liquid crystal molecules in the liquid crystal layer. $K_{11}$ is the splay elastic constant of the liquid crystal molecules in the liquid crystal layer.

It can be found from the formula that the phase difference between the light passing through the liquid crystal layer 3 and the incident light is affected by the refractive index of the liquid crystal molecules and the voltage. At the same time, since the refractive index of the liquid crystal molecules is affected by the voltage provided by the power supply device, the phase difference can be changed by changing the voltage of the power supply device.

The relationship between the phase difference under a zero electric field and the wavelength of light is:

$$\delta_0 = \frac{2\pi \Delta n d}{\lambda}.$$

It can be seen that when the phase difference changes, the wavelength of the light will also change. Different wavelengths of light will show different colors. The wavelength of visible light is between 400 nm and 700 nm. When the wavelength change is between 380 nm~420 nm, the light will turn purple; when the wavelength is between 420 nm~470 nm, the light will turn blue. When the wavelength is between 630 nm~780 nm, the light will turn red. In the present invention, a voltage is provided to the liquid crystal molecules through a power supply device, thereby changing the arrangement direction of the liquid crystal molecules, thereby adjusting the color of light.

In other embodiments of the present invention, the brightness of the light can also be changed by adjusting the state of the voltage. In this embodiment, the included angle between the first polarizer 11 and the second polarizer 12 is 60°~120°. At this time, the variable tint lens will be in a normally transparent state (e.g., no voltage applied across the first and second conductive films), and the color of the light passing through the variable tint lens will be darkened as the voltage applied across the first and second conductive films is increased; when there is an angle between −30°~30° between the first polarizer 11 and the second polarizer 12, the variable tint lens is in a normally dark state (e.g., no voltage applied across the first and second conductive films), and the color of the light passing through the variable tint lens becomes lighter as the voltage applied across the first and second conductive films is increased.

In another embodiment of the present invention, the first polarizer 11 is gray, and the second polarizer 12 is also gray. When the included angle between the first polarizer 11 and the second polarizer 12 is 60° to 120°, the light passing through the variable tint lens changes from light to dark as the voltage applied across the first and second conductive films is increased. When the included angle between the first polarizer 11 and the second polarizer 12 is −30° to 30°, the light passing through the variable tint lens changes from dark to bright as the voltage applied across the first and second conductive films is increased.

In this embodiment, the present invention can also be implemented in various ways based on the color combination of the first polarizer 11 and the second polarizer 12. When the color of the first polarizer 11 is red and the color of the second polarizer 12 is also red, the color change of the light passing through the variable tint lens is a changed between light red and deep red as the voltage applied across the first and second conductive films is increased or decreased (depending on whether variable tint lens is normally transparent or normally dark). Specifically, a variety of implementations can be obtained through the combination of the first polarizer 11 and the second polarizer 12, as follows:

| Polarizer color | gray | red | blue |
|---|---|---|---|
| gray | Bright~dark | gray~red | gray~blue |
| red | gray~red | Light red~dark red | Light purple~dark purple |
| blue | gray~blue | Light purple~dark purple | Light blue~dark blue |

It can be seen from the table that the color combination of the first polarizer 11 and the second polarizer 12 can be converted in multiple colors. It should be noted that only the combination of three colors is indicated in the table. In practical applications, under the idea of the present invention, the colors of the first polarizer 11 and the second polarizer 12 can be multiple. Wherein, when the color combination of two polarizers can generate another color, the change of light is a change of the newly generated color. For example, when the colors of the first polarizer 11 and the second polarizer 12 are respectively blue and red in the table, since the combination of blue and red is purple, the final light will vary from light purple to deep purple. In the same way, when the first polarizer 11 and the second polarizer 12 adopt three primary colors, according to the combination of the colors, light of all colors can be obtained theoretically.

Under the concept of the present invention, the first polarizer 11 and the second polarizer 12 can be provided with at least one color area. In at least one embodiment, the first polarizer 11 includes at least one color area and serves as both (1) a polarizer and (2) a color filter. Similarly, the second polarizer 12 includes at least one color area serves as both (1) a polarizer and (2) a color filter.

In one embodiment, the first polarizer 11 includes only one color area. In other embodiments, the first polarizer 11 includes multiple color areas of different colors. Similar, in one embodiment, the second polarizer 12 includes only one color area. In other embodiments, the second polarizer 12 includes multiple color areas of different colors. When the first polarizer 11 and the second polarizer 12 are both set in one color area, the effect is as shown in the above table. The colors may also differ, as shown in the above table. For example, a color area of the first polarizer 11 may have a red color, and a corresponding color area of the second polarizer 12 may have a blue color. In a preferred embodiment of the present invention, each of the first polarizer 11 and the second polarizer 12 is provided with multiple color regions. The first polarizer 11 and the second polarizer 12 have multiple color combinations, thereby outputting light of multiple colors and improving user experience.

According to some embodiments, each of the first polarizer 11 and the second polarizer 12, which includes at least one color area, is implemented as an integrated unit that serves as both a polarizer and a color filter. For example, each polarizer may be implemented from 1-D (dimensional) subwavelength metal structures having grooves, gratings, and/or nano-slit or nano-hole arrays. According to some embodiments, each of the first polarizer 11 and the second polarizer 12, which includes at least one color area, is implemented as a layered structure comprising a polarizer layer and a separate color filter layer.

The transmittance of light of different wavelengths and the angle between the first polarizer and the second polarizer satisfy:

$$I(\lambda) = A^2 \left\{ \cos^2(\beta - \gamma) - \sin 2\beta \sin 2\gamma \sin^2 \frac{\delta}{2} \right\}$$

Among them, I(λ) is the transmittance of light of different wavelengths, A is the initial incident light intensity, β is the angle between the direction of the incident polarizer's transmission axis and the long axis of the liquid crystal molecules, γ is the angle between the direction of the transmission axis of the outgoing polarizer and the long axis of the liquid crystal molecules.

It can be seen that the transmittance of light of different wavelengths is also affected by the angle between the direction of the transmission axis of the incident polarizer (first polarizer) and the long axis of the liquid crystal molecules. The influence of the angle between the direction of the transmission axis of the exit polarizer (the second polarizer) and the long axis of the liquid crystal molecules. The arrangement direction of the liquid crystal molecules is affected by the applied electric field. For example, the change of the specific color depth is also affected by the change of the voltage.

Among them, the voltage on the liquid crystal layer 3 is provided by the power supply device. The voltage is transmitted to the liquid crystal layer through the conductive film, and its power supply device can be an infrared power supply device or a rechargeable battery. The infrared power supply device is charged by solar energy, and then the output voltage of the power supply device is adjusted. The adjustment method is automatic adjustment, which can be adjusted according to different light intensity. On the basis of the present invention, the specific infrared power supply device can be improved to achieve the effect of dimming the light when the light intensity is increased, thereby enhancing the user experience.

The rechargeable battery can be a wireless rechargeable battery or a wired rechargeable battery. Since the output voltage of the battery does not change automatically with different environments, it is necessary to manually adjust the change of light when using a rechargeable battery.

Specifically, when the infrared power supply device is adopted, the power supply device includes a solar battery and a driving module for converting direct current into alternating current. The solar cell is electrically connected to the driving module, and a light sensor for detecting the intensity of light is provided with electrodes on the variable tint lens. It is electrically connected with the motor through the driving module and is used to provide voltage to the liquid crystal layer 3.

The infrared power supply device can be an infrared broad spectrum (800-2000 nm) thermal photovoltaic cell. This type of photovoltaic cell can use indium arsenide or gallium antimonide as the substrate, and directly convert the energy of the heat radiator into electrical energy through the semiconductor P-N junction. That is, the semiconductor P-N junction is used to produce photovoltaic effect under the irradiation of near infrared light. The principle is similar to that of traditional solar cells, but the difference lies in the use of light sources. Solar cells use sunlight or visible light (400-800 nm), but thermal photovoltaic cells use infrared heat radiation (800-2000 nm). Another advantage of this type of photovoltaic cell is that it can be converted into electric energy without direct irradiation of infrared rays, so it can be hidden in the frame without affecting the aesthetics of the glasses.

When a rechargeable battery is used, the power supply device includes: a power off button, a voltage increase button, and a voltage drop button. The power off button is used to turn off the power supply of the power supply device. The voltage increase button is used to increase the output voltage of the power supply device, and the voltage decrease button is used to decrease the output voltage. The user can manually adjust the voltage output by the power supply device according to the voltage increase button and the voltage drop button, so as to obtain different light colors to determine the most suitable color.

On the basis of the present invention, a manual and automatic combination can also be set, and an infrared power supply device and a rechargeable battery solution can be used to achieve the effect of manual and automatic combination adjustment and meet the needs of users in different situations.

The variable tint lens of the present invention further includes a rubber 4 arranged between the first conductive film 21 and the second conductive film 22, and the liquid crystal layer 3 is covered by the rubber 4. Since the rubber 4 is an insulator, it avoids the problem of the leakage of the conductive film affecting the user's use. Under the idea of the present invention, other insulating materials, such as plastics, can also be used. In the utility model, the materials of the first conductive film and the second conductive film are both ITO.

Among them, the material of the liquid crystal layer adopts one of twisted nematic (TN), super-twisted nematic (STN), electronically controlled birefringence (ECB), or vertical alignment (VA) type of liquid crystal materials.

The present invention also provides a spectacle, which includes a frame and a lens, and the lens adopts the above-mentioned variable tint lens.

Compared with the prior art, the present invention can change the color of light through the design of the first polarizer 11, the second polarizer 12 and the liquid crystal layer 3, and has a better dimming effect. At the same time, by setting the angle between the first polarizer 11 and the second polarizer 12, the brightness of the light can be adjusted, which can adapt to different environmental requirements. At the same time, the present invention can also realize the function of manual adjustment or automatic adjustment through the setting of the power supply device, so that the user can adjust the color and brightness of the light according to the demand and has higher practicability.

The above-mentioned embodiments are only used to illustrate specific implementations of the present invention. It should be pointed out that for those of ordinary skill in the art, without departing from the concept of the present invention, several modifications and changes can be made, and these modifications and changes should fall within the protection scope of the present invention.

EXAMPLES

1. The variable tint light lens is characterized in that it comprises:

A first polarizer and a second polarizer, a liquid crystal layer is provided between the first polarizer and the second polarizer.

The first conductive film is arranged between the first polarizer and the liquid crystal layer.

The second conductive thin mold is arranged between the second polarizer and the liquid crystal layer.

The power supply device is connected to the first conductive film and the second conductive film, receives control signals, and provides different voltages to the liquid crystal layer through the first conductive film and the second conductive film, so that the arrangement direction of the liquid crystal molecules changes according to the magnitude of the voltage provided by the power supply device, so that the refractive index of the liquid crystal molecules to the light changes, so as to change the color of the light passing through the liquid crystal layer.

2. The variable tint lens of claim 1, wherein the liquid crystal molecules are elliptical and have a first refractive index along the long axis direction and a second refractive index along the short axis direction. The refractive index of the liquid crystal molecules is determined according to the first refractive index, the second refractive index, and the arrangement direction.

3. The variable tint lens of claim 2, wherein the phase difference between the light passing through the liquid crystal layer and the incident light satisfies:

$$\delta = \delta_0 \left\{ \frac{1}{4} \left[ (n_e/n_o)^2 + n_e/n_o \right]^{-1} \left[ V^2 - V_{th}^2 \right] \left[ \frac{2}{3} V^2 + (K_{33} - K_{11}) V_{th}/K_{11} \right] \right\}.$$

Among them, $\delta$ is the phase difference, $\delta_0$ is the phase difference under zero electric field, $n_e$ is the refractive index of liquid crystal molecules, and $n_o$ is the refractive index of light in the air.

4. The variable tint lens according to claim 1, wherein when the angle between the first polarizer and the second polarizer is between 60° and 120°, the variable tint lens in the normally transparent state, the color of the light passing through the adjustable light lens becomes darker.

5. The variable color bounce lens according to claim 5, wherein when the angle between the first polarizer and the second polarizer is between −30° and 30°, the variable color bounce lens in a normally dark state, the color of light passing through the variable tint lens becomes lighter.

6. The variable tint lens of claim 4 or 5, wherein the first polarizer include at least one color area having by a first color, the second polarizer includes at least one color area having a second color, and the color of the light passing through the variable tint lens is based on the color combination of the first color of the at least one color area of the first polarizer and the second color of the at least one color area of the second polarizer and the refractive index of the liquid crystal molecules as determined by the magnitude of the voltage provided by the power supply device.

7. The variable tint lens according to claim 6, wherein the angle between the light passing through the variable tint lens and the polarizer and the liquid crystal molecules satisfies:

$$I(\lambda) = A^2 \left\{ \cos^2(\beta - \gamma) - \sin 2\beta \sin 2\gamma \sin^2 \frac{\delta}{2} \right\}.$$

Among them, $I(\lambda)$ is the transmittance of light of different wavelengths, A is the initial incident light intensity, $\beta$ is the angle between the direction of the transmission axis of the first polarizer and the long axis of the liquid crystal molecules, $\gamma$ is the angle between the direction of the light transmission axis of the second polarizer and the long axis of the liquid crystal molecules.

8. The variable tint lens according to claim 1, wherein the power supply device is a photovoltaic power supply device, and the control signal is generated according to the light intensity detected by the photovoltaic power supply device.

9. The variable tint lens according to claim 7, wherein the photovoltaic power supply device comprises a solar battery, a driving module for converting direct current into alternating current, and a light sensor for detecting light intensity. The output of the photovoltaic power supply device varies according to the light intensity detected by the light sensor.

10. The variable tint lens of claim 1, wherein the power supply device is a rechargeable battery, and the control signal is input by the user according to his own needs.

11. The variable tint lens according to claim 9, wherein the power supply device further comprises a power-off button, a voltage-up button, and a voltage-down button connected to the rechargeable battery.

The color of light passing through the variable tint lens is adjusted according to the power-off button, the voltage-up button and the voltage-down button.

12. The variable tint lens of claim 1, further comprising a rubber disposed between the first conductive film and the second conductive film. The rubber, the first conductive film and the second conductive film jointly cover the liquid crystal layer.

13. The variable tint lens of claim 1, wherein the liquid crystal layer is made of one of TN, STN, ECB, and VA materials.

14. The variable tint lens of claim 1, wherein the materials of the first conductive film and the second conductive film are both ITO.

15. A spectacle, comprising a lens and a frame, characterized in that the lens adopts the variable tint lens according to any one of claims 1 to 14.

16. A variable tint lens having a first polarizer with a first surface and a second surface parallel to the first surface, a second polarizer with a first surface and a second surface, the first surface and second surface of the second polarizer substantially parallel to the first surface of the first polarizer, a liquid crystal layer having liquid crystal molecules between the first polarizer and the second polarizer, a first conductive film between the first polarizer and the liquid crystal layer, a second conductive film between the second polarizer and the liquid crystal layer, and a power supply device electrically coupled to the first conductive film and the second conductive film configured to supply voltage to the first conductive film and the second conductive film.

17. In another embodiment of the variable tint lens, where the liquid crystal molecules are configured to change orientation relative to the first surface of the first polarizer according to the magnitude of voltage supplied by the power supply.

18. In another embodiment of the variable tint lens, where an index of refraction of the liquid crystal molecules varies with the change in orientation for a wave propagating perpendicular to the first surface of the first polarizer through the liquid crystal molecule.

19. In another embodiment of the variable tint lens, further having a control unit communicatively coupled to the power supply.

What is claimed is:

1. A variable tint lens comprising:
    a first polarizer with a first surface and a second surface parallel to the first surface;
    a second polarizer with a first surface and a second surface, the first surface and second surface of the second polarizer substantially parallel to the first surface of the first polarizer;
    a liquid crystal layer having liquid crystal molecules between the first polarizer and the second polarizer;
    a first conductive film between the first polarizer and the liquid crystal layer;
    a second conductive film between the second polarizer and the liquid crystal layer; and
    a power supply device electrically coupled to the first conductive film and the second conductive film and configured to supply a voltage to the first conductive film and the second conductive film,
    wherein a phase difference between a phase of light passing through the liquid crystal layer and a phase of an incident light satisfies:

$$\delta = \delta_0 \left\{ \frac{1}{4}\left[(n_e/n_o)^2 + n_e/n_o\right]^{-1}\left[V^2 - V_{th}^2\right]\left[\frac{2}{3}V^2 + (K_{33} - K_{11})V_{th}/K_{11}\right]\right\}$$

wherein
        $\delta$ is the phase difference,
        $\delta_0$ is the phase difference under zero electric field,
        $n_e$ is a refractive index of liquid crystal molecules, and
        $n_o$ is the refractive index of air for light traveling in the air.

2. The variable tint lens of claim 1, wherein the liquid crystal molecules are configured to change orientation thereof relative to the first surface of the first polarizer according to a magnitude of the voltage supplied by the power supply device.

3. The variable tint lens of claim 2, wherein the refractive index of the liquid crystal molecules varies with the change in the orientation of the liquid crystal molecules for a wave propagating perpendicular to the first surface of the first polarizer through the liquid crystal molecule.

4. The variable tint lens of claim 1, further comprising a control unit communicatively coupled to or integrated within the power supply device.

5. The variable tint lens of claim 1, wherein the liquid crystal molecules are elliptical in shape and have a first refractive index along a long axis direction of the liquid crystal molecule and a second refractive index along a short axis direction of the liquid crystal molecule.

6. The variable tint lens of claim 1, wherein the first polarizer is configured to polarize light in a first direction and the second polarizer is configured to polarize light in a second direction and an angle between the first direction and the second direction on a plane parallel to the first surface of the first polarizer is between 60° and 120°.

7. The variable tint lens of claim 1, wherein the first polarizer is configured to polarize light in a first direction and the second polarizer is configured to polarize light in a second direction and an angle between the first direction and the second direction on a plane parallel to the first surface of the first polarizer is between −30° and 30°.

8. The variable tint lens of claim 6 or 7, wherein the first polarizer includes at least one color area having a first color, the second polarizer includes at least one color area having a second color, and a color of light passing through the variable tint optical lens is a function of (1) the first color of the at least one color area of the first polarizer, (2) the second color of the at least one color area of the second polarizer, and (3) the refractive index of the liquid crystal molecules as determined by the magnitude of the voltage supplied by the voltage supply device.

9. A variable tint lens comprising:
    a first polarizer with a first surface and a second surface parallel to the first surface;
    a second polarizer with a first surface and a second surface, the first surface and second surface of the second polarizer substantially parallel to the first surface of the first polarizer;
    a liquid crystal layer having liquid crystal molecules between the first polarizer and the second polarizer;
    a first conductive film between the first polarizer and the liquid crystal layer;
    a second conductive film between the second polarizer and the liquid crystal layer; and
    a power supply device electrically coupled to the first conductive film and the second conductive film and configured to supply a voltage to the first conductive film and the second conductive film,
    wherein transmittance of light of different wavelengths and angles between directions of transmission axes of the first and second polarizers and a long axis of the liquid crystal molecules satisfies:

$$I(\lambda) = A^2 \left\{ \cos^2(\beta - \gamma) - \sin 2\beta \sin 2\gamma \sin^2 \frac{\delta}{2} \right\}$$

wherein, $I(\lambda)$ is the transmittance of the light of the different wavelengths, A is initial incident light intensity, $\beta$ is the angle between the direction of the transmission axis of the first polarizer and the long axis of the liquid crystal molecules, $\gamma$ is the angle between the direction of the light transmission axis of the second polarizer and the long axis of the liquid crystal molecules.

10. The variable tint lens of claim 1, wherein the power supply device is a photovoltaic power supply device and a control signal is generated according to light intensity detected by the photovoltaic power supply device.

11. The variable tint lens of claim 10, wherein the photovoltaic power supply device comprises a solar battery, a driving module for converting direct current into alternating current, and a light sensor for detecting light intensity; and
    the photovoltaic power supply is configured to vary voltage output according to the light intensity detected by the light sensor.

12. The variable tint lens of claim 1, wherein the power supply device is a rechargeable battery and a control signal is an input by a user.

13. The variable tint lens of claim 12, wherein the power supply device further comprises a power-off button, a voltage-up button, and a voltage-down button, and wherein the power-off button, the voltage-up button, and the voltage-down button is communicatively coupled to the rechargeable battery.

14. The variable tint lens of claim 1, further comprising a rubber disposed between the first conductive film and the second conductive film, wherein the rubber, the first conductive film, and the second conductive film jointly cover the liquid crystal layer.

15. The variable tint lens of claim 1, wherein the liquid crystal layer is made of one of TN, STN, ECB, and VA materials.

16. The variable tint lens of claim 1, wherein materials of the first conductive film and the second conductive film are both ITO.

17. A spectacle, further comprising a frame with a lens holder and the variable tint light lens according to any one of claims 1 to 13.

* * * * *